March 6, 1951     J. F. CALVERT     2,543,832
POT LID HOLDER
Filed April 1, 1949
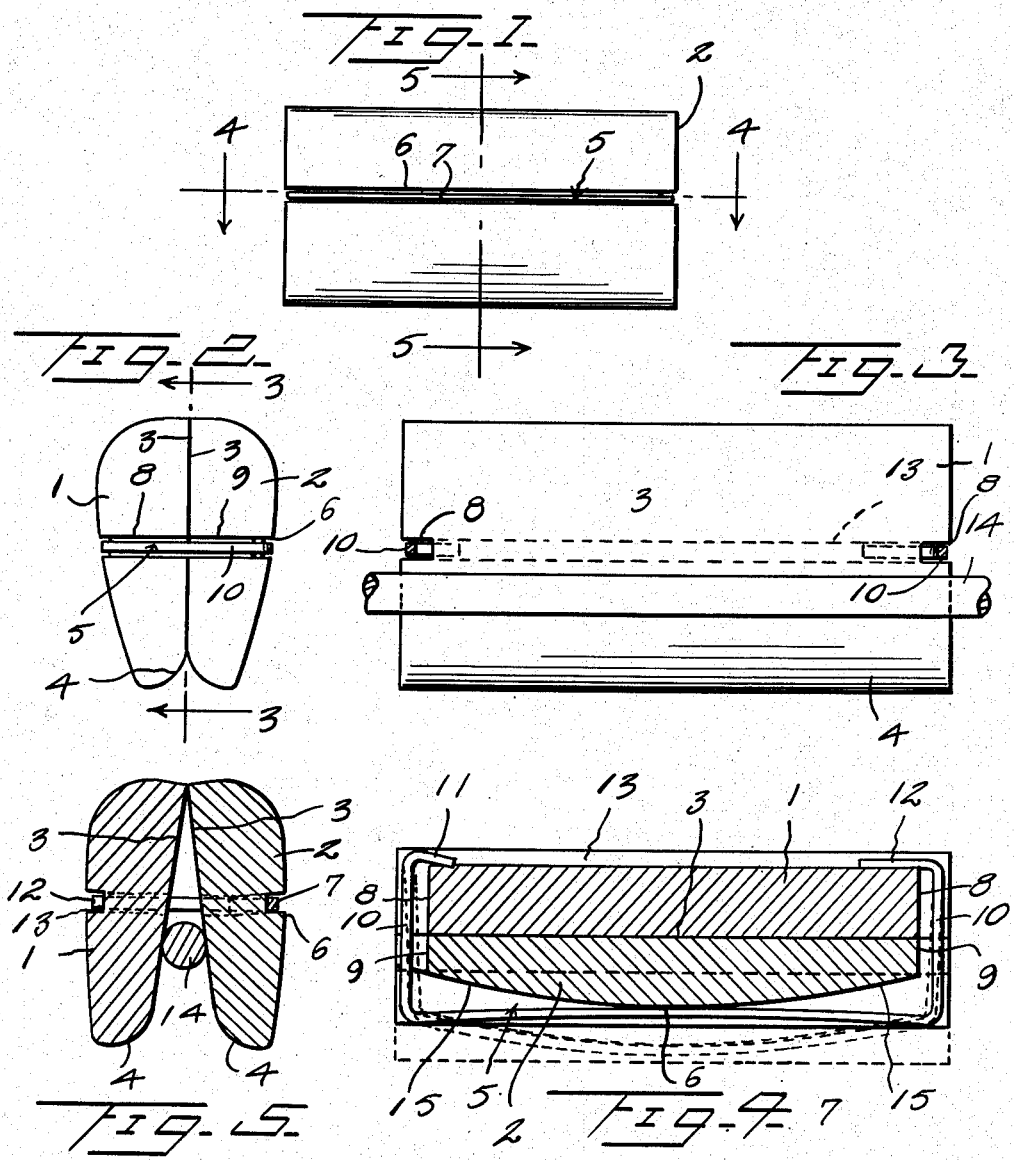
INVENTOR.
John F. Calvert
BY
Attys.

Patented Mar. 6, 1951

2,543,832

UNITED STATES PATENT OFFICE 2,543,832

POT LID HOLDER

John Francis Calvert, Huntington, Ind.

Application April 1, 1949, Serial No. 84,985

1 Claim. (Cl. 16—116)

This invention relates to new and useful improvements in pot lid holders.

The primary object of my invention is to provide a holder of the character specified that may be slipped on the handle of a pot lid or other cooking utensil to enable the user to remove and hold the lid or other utensil without burning the hands.

A further object of my invention is to provide a pot lid holder that is simple and economical in construction and highly efficient, durable and convenient in use.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a side elevation of a pot lid holder constructed in accordance with my invention.

Figure 2 is an end view.

Figure 3 is a vertical longitudinal section, taken on line 3—3 of Figure 2, looking in the direction indicated by the arrows.

Figure 4 is a horizontal section, taken on line 4—4 of Figure 1, and Figure 5 is a vertical transverse section, taken on line 5—5 of Figure 1, looking in the direction indicated by the arrows.

Referring to the drawings for a more particular description of my invention, and in which drawings like parts are designated by like reference characters throughout the several views, my pot lid holder essentially comprises the two corresponding rectangular oblong gripper strips or members 1 and 2, formed with the straight flat inner faces 3 and the inwardly curved or beveled lower edges 4.

Normally the gripper strips or members are held in closed position, that is to say, with their flat inner faces fitting against each other, by means of the U-shaped wire holder 5, of spring steel or other suitable material possessing the required resiliency. As shown, the body portion of the gripper strip 2 is formed in its outer face with a central horizontal longitudinally disposed groove 6 to receive the body portion 7 of the wire holder 5, and the ends of the gripper strips formed with aligned transverse recesses 8 and 9 to receive the ends 10 of said holder. The ends 10 of the wire holder 5 are bent inwardly at right angles to form the hooks 11 and 12, which rest in the central horizontal groove 13 formed in the outer face of the gripper strip 1. Particular attention is invited to the fact that the longitudinally disposed groove 6 in the outer face of the body portion of the gripper strip 2 is of greater depth at the ends 15 thereof than at the middle portion to permit the gripper strips to move apart to grip the handle of the lid of a pot or other cooking utensil.

In practice, the lower beveled edges 4 of the gripper strips 1 and 2 are slipped over the handle 14 of the lid of the pot or other cooking utensil against the tension of the wire holder 5, preparatory to removing the lid, and thus provide a convenient means for removing and holding the lid without burning the hands. The resilient wire holder 5 will assist in holding the gripper strips 1 and 2 in clamping engagement with the handle and will return and hold the former in normal closed position when released by the operator.

The gripper strips may be made of wood, plastics, or other heat insulating material.

From the foregoing description taken in connection with the drawings, it is thought that the construction, operation and advantages of my invention will be readily understood, without requiring a more extended explanation.

Having described my invention, what I claim as new and desire to secure by Letters Patent, is:

A pot holder comprising a pair of corresponding rectangular oblong gripper strips having flat inner faces and inwardly beveled edges along one side thereof, said gripper strips formed in their outer faces with longitudinally disposed grooves and in their opposite ends with aligned recesses registering with the corresponding grooves, a resilient wire holder of substantially U-shape form, arranged with its body portion fitting in the longitudinal groove of one gripper strip and its end portions fitting in said aligned recesses, with the ends of the wire holder terminating in right-angular bent terminals fitting in the longitudinal groove of the other gripper strip, the longitudinal groove in the gripper strip receiving the body portion of the resilient wire holder being of greater depth at the ends thereof than at the middle portion to provide clearance between the ends of the body portion of said wire holder and the bottom of said groove, whereby the gripper strips are permitted to spread apart in engaging the handle of a lid.

JOHN FRANCIS CALVERT.

REFERENCES CITED

The following references are of record in the file of this patent:

UNITED STATES PATENTS

| Number | Name | Date |
|---|---|---|
| 1,501,480 | Dye | July 15, 1924 |